United States Patent [19]

Hara

[11] Patent Number: 5,103,309
[45] Date of Patent: Apr. 7, 1992

[54] DISPLAY APPARATUS

[75] Inventor: Zenichiro Hara, Nagasaki, Japan

[73] Assignee: Mitsubishi Denki Kabushiki Kaisha, Tokyo, Japan

[21] Appl. No.: 468,216

[22] Filed: Jan. 22, 1990

[30] Foreign Application Priority Data

May 26, 1989 [JP] Japan ................... 1-133681

[51] Int. Cl.⁵ .................. H04N 7/01; H04N 7/04; H04N 11/06
[52] U.S. Cl. ................... 358/141; 358/140; 358/12; 358/21 V; 340/728
[58] Field of Search ............ 358/140, 141, 12, 21 V, 358/135, 136, 230; 340/728, 731

[56] References Cited

U.S. PATENT DOCUMENTS

| | | | |
|---|---|---|---|
| 4,551,754 | 11/1985 | Meise et al. | 358/180 |
| 4,631,584 | 12/1986 | Reitmeier | 358/141 |
| 4,782,383 | 11/1988 | Isnordi | 358/12 |
| 4,833,542 | 5/1989 | Hara et al. | 358/230 |
| 4,901,155 | 2/1990 | Hara et al. | 358/230 |
| 4,916,525 | 4/1990 | Drummond | 358/141 |
| 4,932,066 | 6/1990 | Nakayama et al. | 358/135 |

FOREIGN PATENT DOCUMENTS

60-237774 11/1985 Japan.
1-174084 7/1989 Japan.
2105548 3/1983 United Kingdom.

*Primary Examiner*—John K. Peng
*Attorney, Agent, or Firm*—Burns, Doane, Swecker & Mathis

[57] ABSTRACT

The present invention relates to a display apparatus having a large-scaled pixel number and capable of displaying a television image and the like. In the display apparatus, after data included in an effective segment of an input signal have been A/D-converted, the converted digital data are stored into a frame memory. Then, while the stored digital data are read from the frame memory, an enlarging control unit adds the pixel data which can be transmitted within a time period corresponding to the horizontal blanking period and also the vertical blanking period, to the read digital data. The resultant digital data are transferred to a display unit.

3 Claims, 9 Drawing Sheets

(e) INTERPOLATION OPERATION FOR SCANNING LINES AND ENLARGING OPERATION IN HORIZONTAL DIRECTION

(f) DISPLAY ON SCREEN

| 01 | 02 | 03 | 04 | 05 | 06 |  |  |  |  | 0 |
|----|----|----|----|----|----|--|--|--|--|---|
| 11 | 12 | 13 | 14 | 15 | 16 |  |  |  |  | 1 |
| 21 | 22 | 23 | 24 | 25 | 26 |  |  |  |  | 2 |
| 31 | 32 | 33 | 34 | 35 | 36 |  |  |  |  | 3 |
| 41 | 42 | 43 | 44 | 45 | 46 |  |  |  |  | 4 |
| 51 | 52 | 53 | 54 | 55 | 56 |  |  |  |  | 5 |

FIG. 9(f)

(g) DISPLAY ON SCREEN

| 01 | 02 | 02 | 03 | 04 | 04 | 05 | 06 | 06 |  | 0 |
|----|----|----|----|----|----|----|----|----|--|---|
| 01 | 02 | 02 | 03 | 04 | 04 | 05 | 06 | 06 |  | 1 |
| 11 | 12 | 12 | 13 | 14 | 14 | 15 | 16 | 16 |  | 2 |
| 21 | 22 | 22 | 23 | 24 | 24 | 25 | 26 | 26 |  | 3 |
| 21 | 22 | 22 | 23 | 24 | 24 | 25 | 26 | 26 |  | 4 |
| 31 | 32 | 32 | 33 | 34 | 34 | 35 | 36 | 36 |  | 5 |
| 41 | 42 | 42 | 43 | 44 | 44 | 45 | 46 | 46 |  | 6 |
| 41 | 42 | 42 | 43 | 44 | 44 | 45 | 46 | 46 |  | 7 |

DISPLAY APPARATUS

BACKGROUND OF THE INVENTION

1. Field of the Invention

The present invention relates to a display apparatus capable of displaying a television image (picture) on various types of plain display where pixels are arranged in a matrix form.

2. Description of the Prior Art

Figure 1:
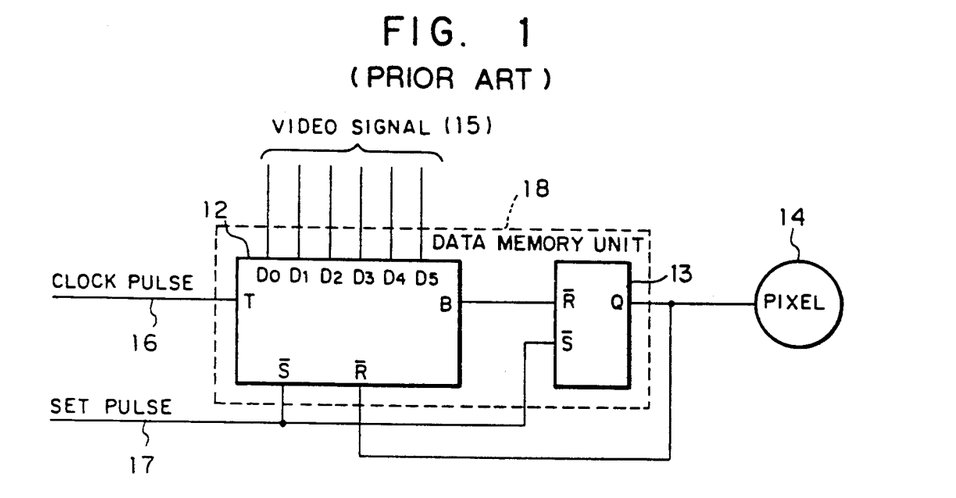
FIG. 1 is a schematic block diagram of the conventional pixel drive unit.

FIG. 1 is a schematic block diagram of a signal processing unit of a conventional display apparatus described in, for instance, Japanese KOKAI (Disclosure) patent application No. 56-4185 In the signal processing unit shown in FIG. 1, reference numeral 12 denotes a down counter; reference numeral 13 represents a flip-flop; reference numeral 14 indicates a pixel; reference numeral 15 is a video signal line; reference numeral 16 denotes an input line for a clock pulse; and reference numeral 17 indicates an input line for a set pulse.

Figure 2:
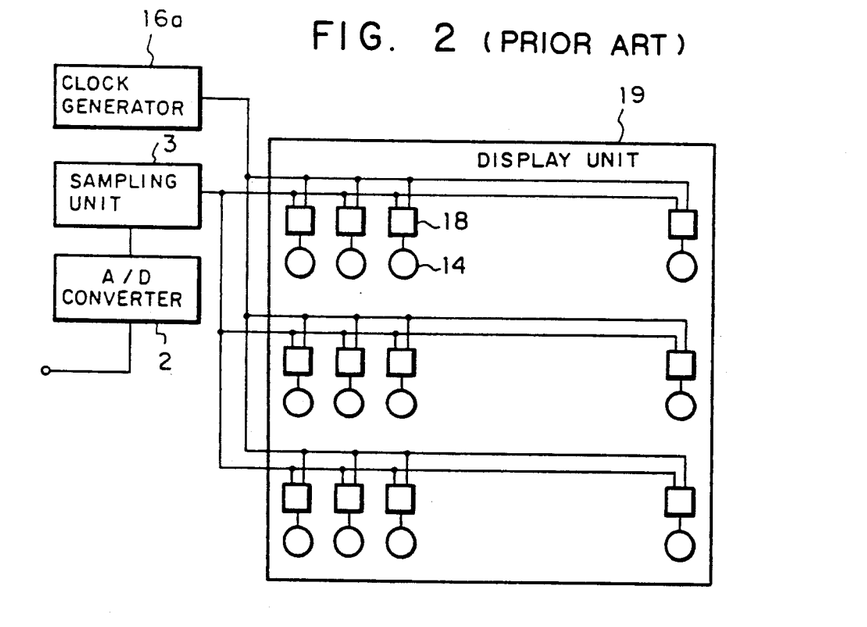
FIG. 2 is a schematic block diagram of the display unit employed in the conventional display apparatus.
Figure 3:
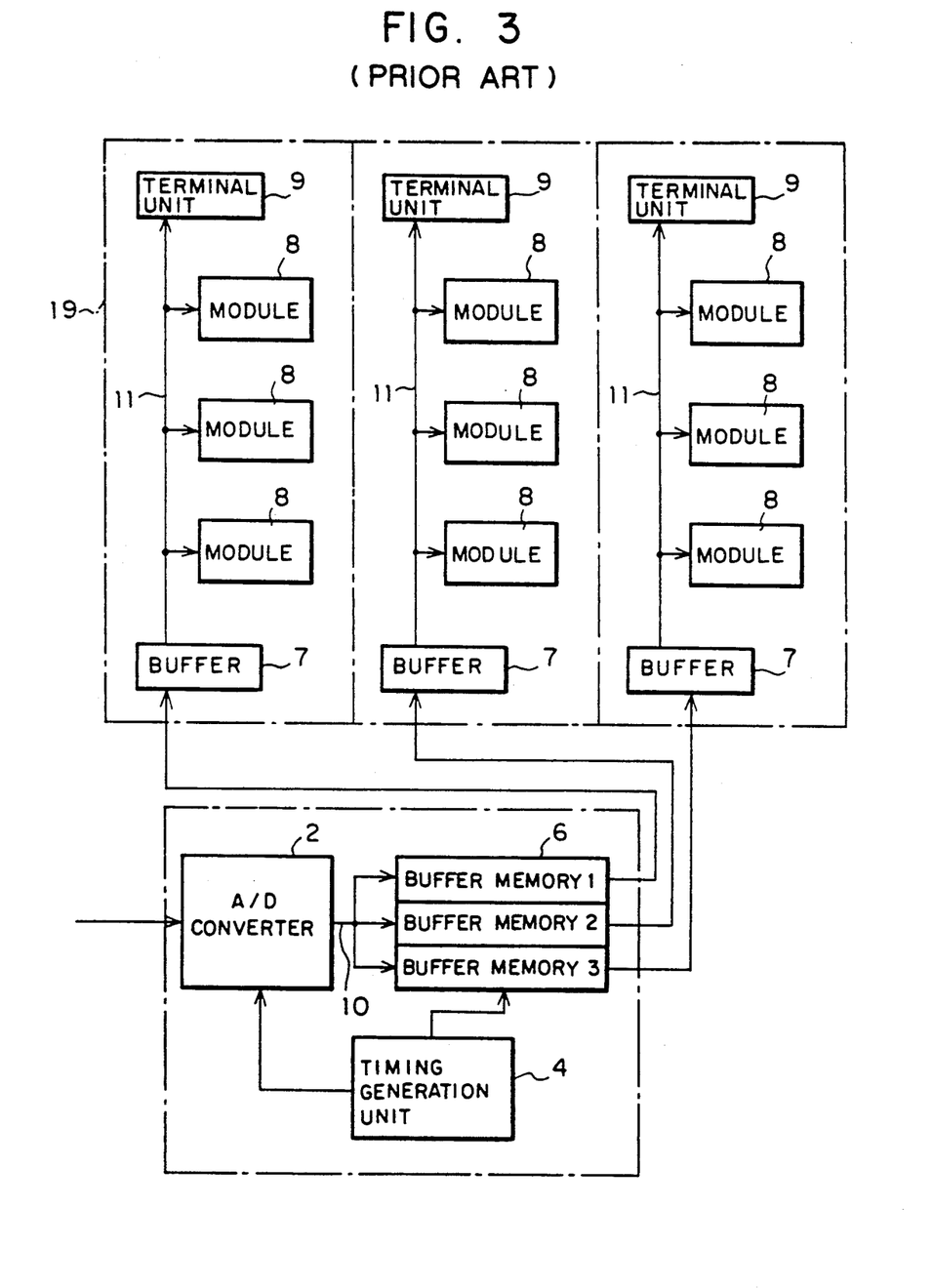
FIG. 3 is a schematic block diagram of one example of a concrete arrangement of the conventional display apparatus.

As represented in FIG. 2, a large quantity of these components are arranged in a matrix form so as to constitute a single display unit 19. Furthermore, in order to improve the transmission efficiency of the image information to the various units, as illustrated in FIG. 3, a module 8 having a predetermined number of pixels is arranged and thus the data are separately transferred to the respective modules 8. It should be noted that reference numeral 7 indicates a buffer and reference numeral 9 represents a terminal unit.

An operation of the conventional display apparatus will now be described. In FIG. 3, each data in an effective segment of the television image (picture) is converted into a digital signal having a predetermined bit number (6 bits in the preferred embodiment) by an A/D converter 2. Then, the digital signal is sampling-processed in accordance with the pixel number of the screen by a predetermined timing signal outputted by a timing generating unit 4. The sampled data are transferred via a first bus 10 to the respective buffer memories 6 and once stored therein. The information is transferred to the respective modules 8 from the buffer memory 6 at a lower speed, as compared with the input velocity of the information which is input from the first bus 10.

Figure 4A:
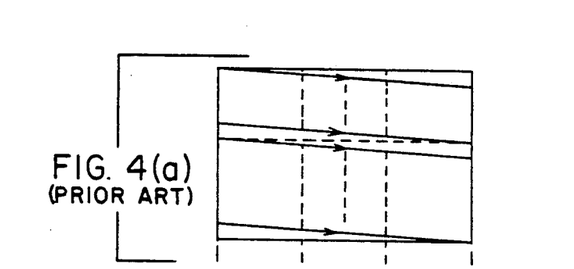
FIGS. 4a, 4b, 4c are explanatory diagrams for explaining the data transmission effected in the apparatus shown in FIG. 3.
Figure 4B:
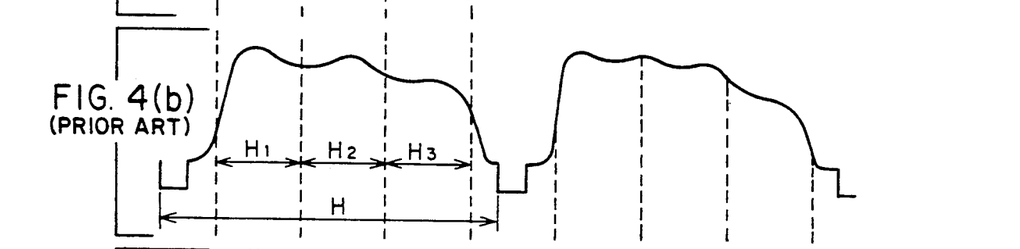
Figure 4C:
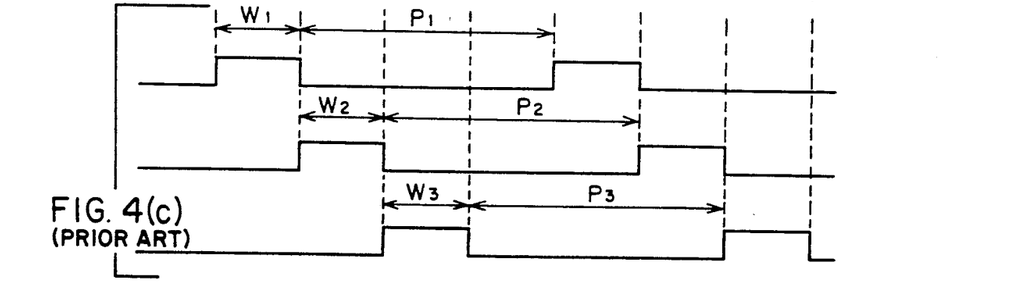
Figure 5A:
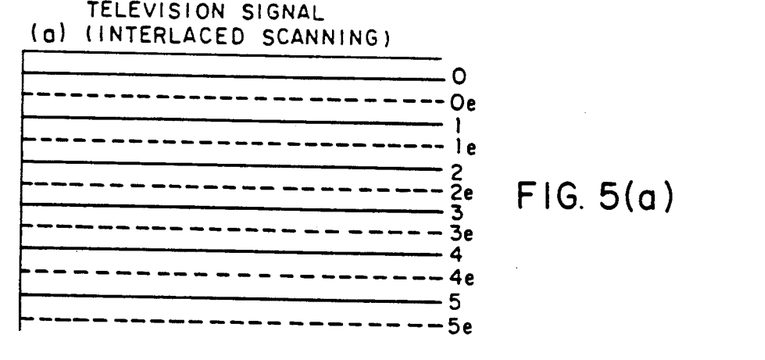
FIGS. 5a, 5b, 5c, 5d are explanatory diagrams for representing one example of the television signal sampling method.
Figure 5B:
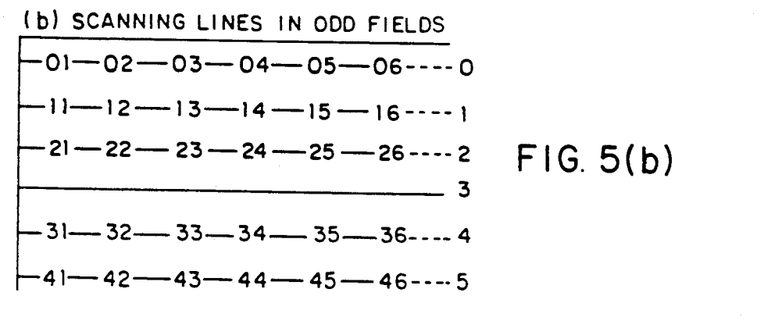
Figure 5C:
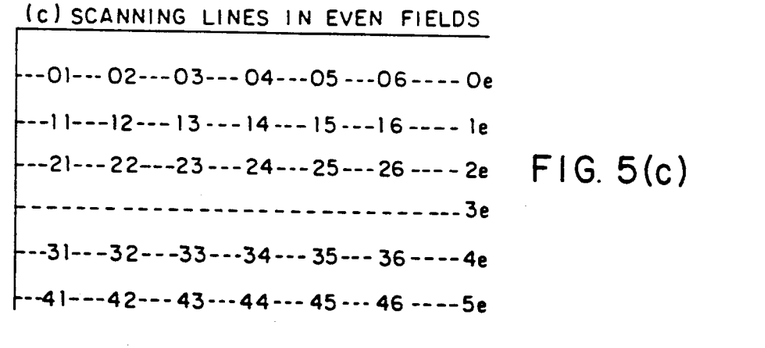
Figure 5D:
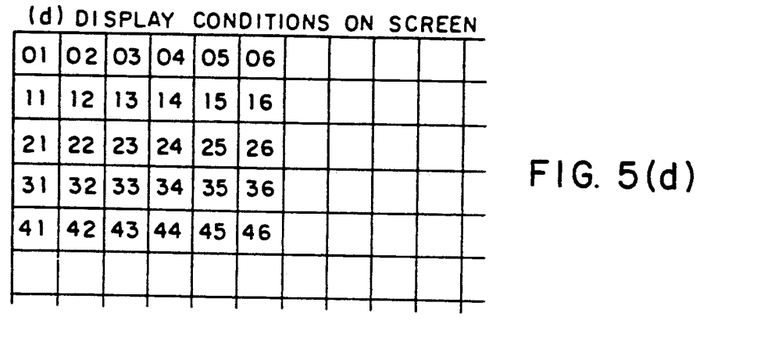

In FIG. 4, there is shown a schematic diagram for explaining the data transfer speed conversion effected in the buffer memory 6. For instance, effective data included in 1 scanning line (1H) are subdivided among 3 groups of signals (denoted by $H_1$, $H_2$, $H_3$ in FIG. 4). Then, these subdivided signals $H_1$, $H_2$, and $H_3$ are stored in the buffer memory 6 during time periods $W_1$, $W_2$, and $W_3$, respectively. The write operations into the buffer memory 6 are performed when interval time periods $P_1$, $P_2$, and $P_3$ have gone by after the write operations of the signals $H_1$, $H_2$, and $H_3$ in the preceding scanning line have been accomplished. Thus, the read time periods $P_1$, $P_2$, and $P_3$ can be established with respect to the write time periods $W_1$, $W_2$, and $W_3$. It should be noted that the first bus 10 corresponds to a high-speed data bus through which the signal produced by directly A/D-converting the television image passes, whereas the second bus 11 corresponds to a low-speed data bus in which the data transfer speed is lowered. As a result, a flat cable can be utilized. In the second data bus 11, the data are successively transferred from the head address of the buffer memory 6 and the succeeding addresses. In the module 8, predetermined data are received based upon the addresses, and the received data are stored into a predetermined data memory unit 18 corresponding to the respective pixels.

The circuit shown in FIG. 1 is one example in which the present unit of the down counter 12 is utilized as the data memory unit 18. When the flip-flop 13 is turned ON in response to the set signal, the 6-bit video signal 15 is loaded on the down counter 12 at the same time. Immediately, this down counter 12 counts the clock and outputs a borrow signal at a time instant corresponding to the loaded data. Thus, the flip-flop 13 is turned OFF and then the counting operation by the down counter 12 is completed The flip-flop 13 has become of ON state during one of 64-step time widths in response to the data, so as to drive the pixels.

FIG. 5 is an explanatory diagram for representing a relationship between the scanning lines of the television signal and the pixels. In general, a television signal contains a large amount of information, and in a screen side, this television signal is utilized on condition that a number of the data of the television signal becomes even to the pixel number include in the screen by thinning out from this television signal. In the example shown in FIG. 5, the scanning lines (3, 3e) have been thinned out in accordance with the pixel numbers of the screen along the vertical direction. The similar thin out process or a change in the sampling period is carried out also in the horizontal direction of the screen, taking account of the pixel number of the screen along the horizontal direction. Since the data of the respective pixels are updated in synchronism with the television signal every 1 field (1/60 seconds in the NTSC TV system), the television image with 64 gradations is displayed on the screen (display unit 19) by repeating the above-described operation every pixels.

As previously described, in such a display apparatus, a portion of the entire information amount owned by the input signal has been utilized. As a consequence, the pixel number contained in the screen is restricted by the information amount of the television signal. For instance, the pixel number of the screen in the vertical direction is about 240 (a total scanning line within 1 field in the NTSC TV system) in case of the NTSC television signal, and similarly the pixel number thereof in the horizontal direction is limited by the sampling period.

Very recently, on the other hand, there is a trend on the screen that the higher density display is more required. That is to say, the total pixel number constituting the screen tends to be increased. The higher sampling speed is required for realizing the high density in the horizontal direction of the screen. Also, the total number of the scanning line is needed to be increased by way of, e.g., the interpolation method in order to realize the high density of the screen in the vertical direction in case that the pixel number of the screen in the vertical direction exceeds over the number of the effective scanning lines of the television signal (approximately 240 lines/field in case of the NTSC TV system).

Since the interpolation of data is performed in the vertical direction and the horizontal direction at the portion before the first bus 10, in general, transmitted information amount per unit time increases according to an increase in a pixel number of the screen (information amount in the screen).

As the conventional display apparatus is arranged with the above-described arrangement, if the information amount required for the high density of the display unit 19 tends to be increased there is a limitation in the actual screen size because the information amount of the data which can pass through the data transmission path per unit time (especially if a flat cable is employed as the data transmission path) is restricted.

SUMMARY OF THE INVENTION

The present invention has been attempted to solve the above-described problems, and therefore, has an object to provide a display apparatus capable of increasing the total amount of the information without increasing the peak transmission amount of the information per unit time, and of displaying the television image on the display unit having a large quantity of the pixels.

In the display apparatus according to the present invention, there are employed an A/D converter for converting a signal in an effective segment of an input television image into a corresponding digital signal, and also a sampling unit for picking up the digital signal so as to make a television signal; this television signal is stored into a frame memory; while the television signal is read out from the frame memory, only pixels which can be transferred during a time period corresponding to both the horizontal and vertical blanking time periods contained in the television image are added to the television signal by an enlarge control unit; and the television signal for display purposes to which the pixels have been added is transferred via the signal transmission path to the display unit.

The display apparatus according to the present invention has the particular advantages as follows. That is, since the time period corresponding to both the horizontal and vertical blanking time periods of the television image is added to the time period during which the television signal is effective, the overall information amount can be increased without increasing the peak information transmission amount per unit time, the data can be effectively transported to the screen having a relative large pixel quantity, as compared with the information amount contained in the television image, and therefore the television image can be correctly displayed without any difficulties.

DETAILED DESCRIPTION OF THE PREFERRED EMBODIMENTS

Referring now to drawings, one preferred embodiment of the present invention will be described.

Figure 6:
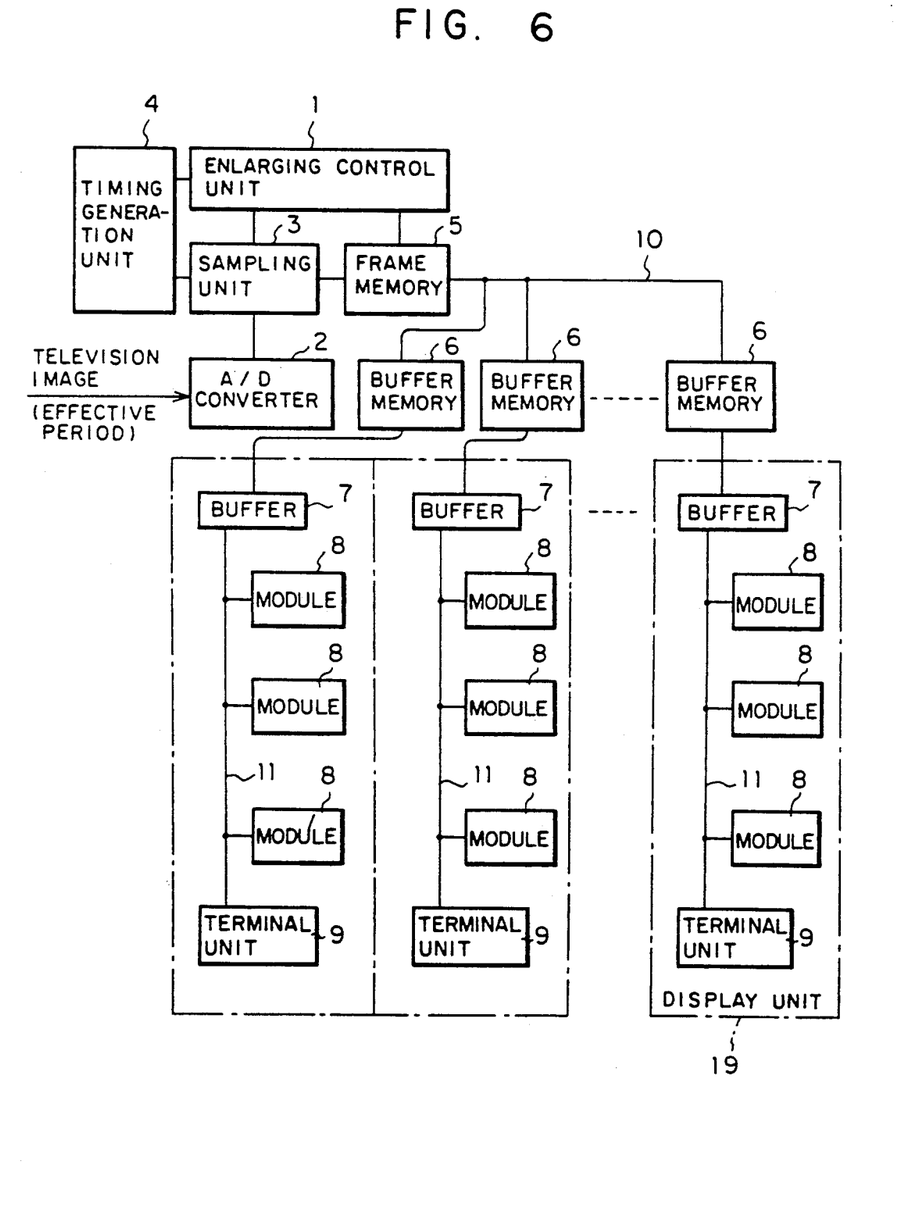
FIG. 6 is a schematic block diagram for representing an arrangement of a display apparatus according to a preferred embodiment of the present invention.
Figure 7:
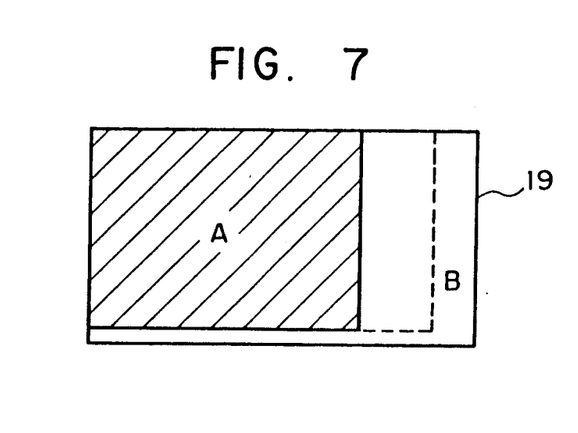
FIG. 7 is an illustration for explaining the concept of the television image displayed on the screen having the relatively large pixel number.
Figure 8:
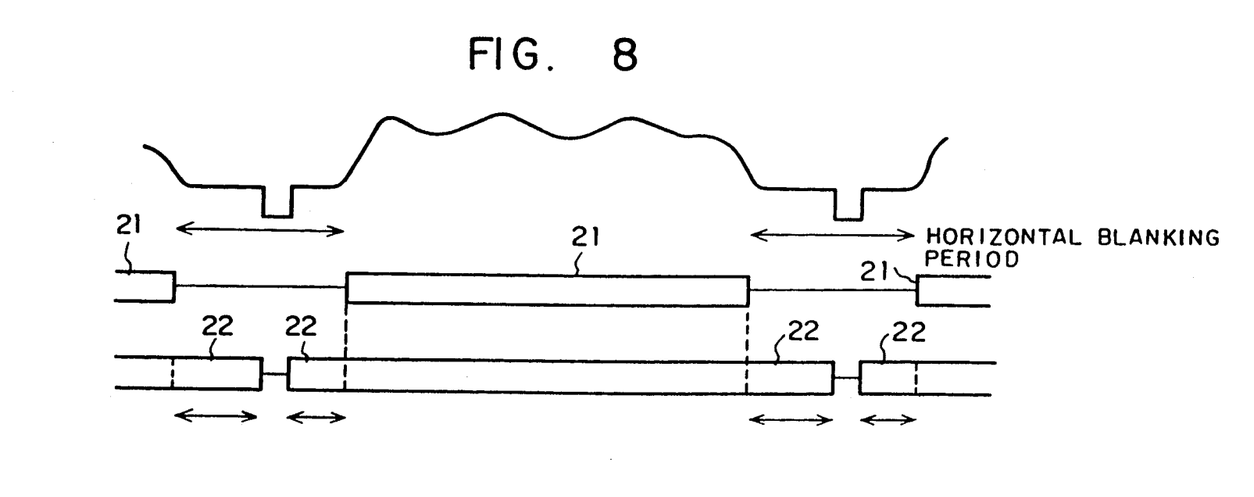
FIG. 8 is a timing chart for explaining the operation of the display apparatus according to a preferred embodiment of the present invention.

In FIG. 6, there is shown an overall arrangement of a display apparatus according to the present invention. FIG. 7 is an illustration for explaining the concept of the television image displayed on the screen having the relatively large pixel number. FIG. 8 is a timing chart for explaining the operation of the display apparatus according to the present invention. In the arrangement shown in FIG. 6, reference numeral 1 indicates an enlarging control unit for enlarging the television signal; and reference numeral 5 represents a frame memory for storing the television signal which has been A/D-converted. Other blocks are identical to those shown in FIG. 3.

Figure 9A:
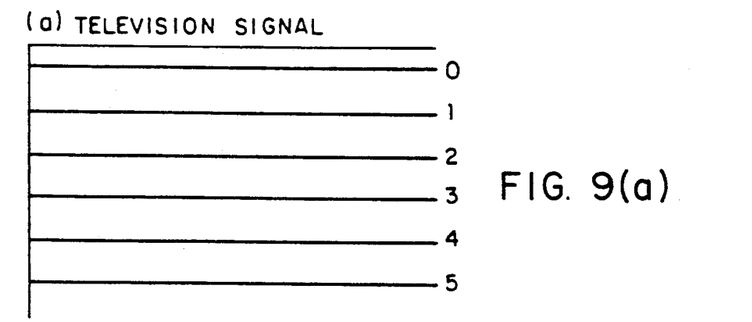
FIGS. 9a-9g are explanatory diagrams for representing one of the interpolation method for enlarging the image.
Figure 9B:
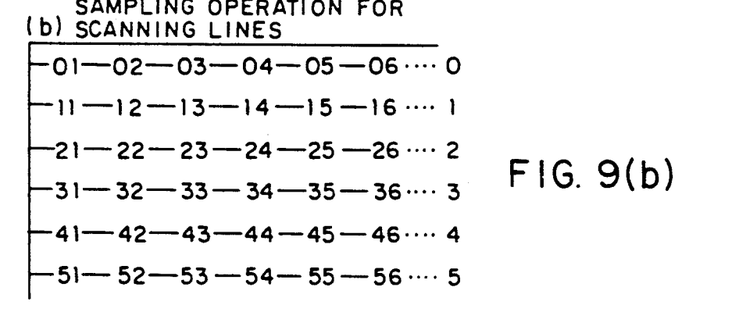
Figure 9C:
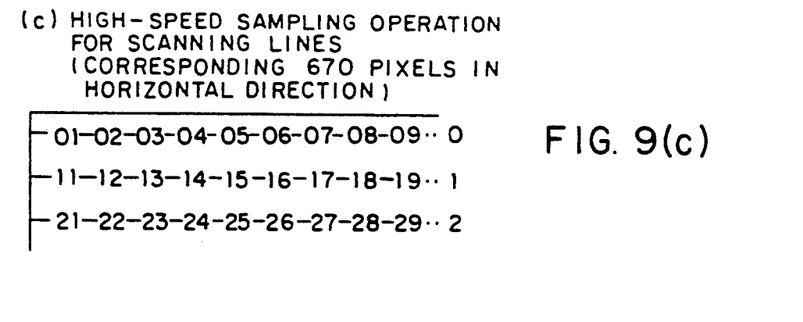
Figure 9D:
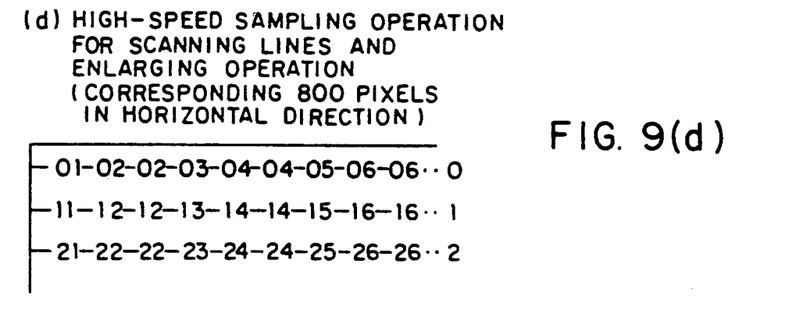
Figure 9E:
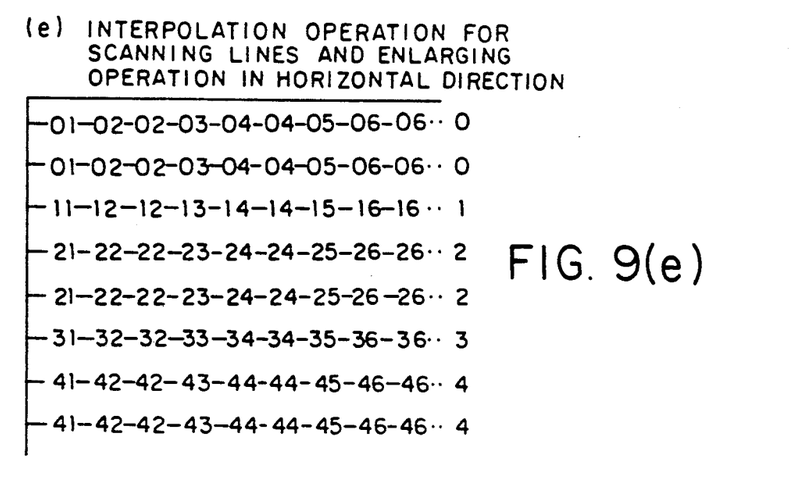
Figure 9F:
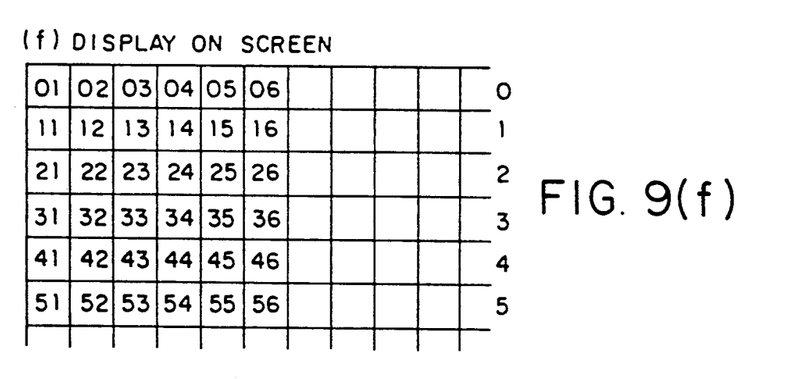
Figure 9G:
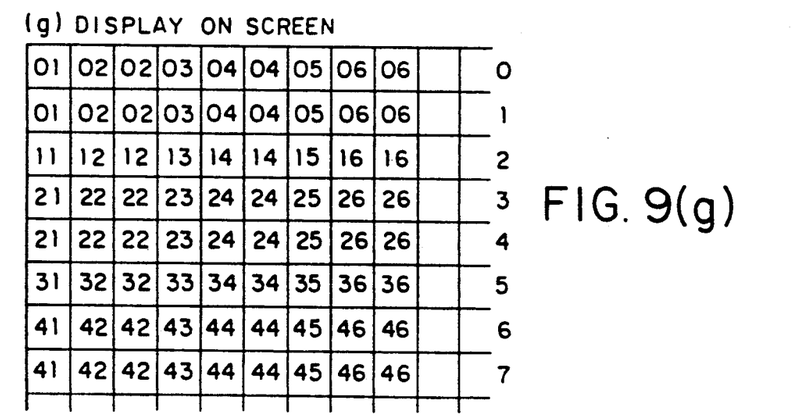

Now, an operation of the display apparatus will be described. First, after the television image has been A/D-converted by the A/D converter 2 at a predetermined timing, the converted television image is once stored into the frame memory 5. Further, the stored television image is read at a preselected timing and then transferred to the first bus 10. In FIG. 7, an "A" part represents a screen scale corresponding to the prior art and an inside thereof utilizes a portion of the information amount contained in the television signal, as represented in FIG. 5. the large scaled pixel number, to which the present invention is applied as shown in a "B" part of FIG. 7, the interpolation on the information is necessarily required. It should be understood that the data interpolation is achieved in the horizontal (X) direction, if the television image is sampled at a higher speed so as to derive a large quantity of digitalized information, therefore the data transmission speed of the first bus 10 becomes high. With such a solution, an increase of the information amount may be allowed to some extent in the first bus 10. However, there is a still limitation in such a high-speed solution of the television image. Assuming now that a limit in the frequency of the signal which can be transferred through the first bus 10 is 12.5 MHZ, the pixel number in the horizontal direction amounts to approximately 670 at maximum if the above solution method is introduced (in case that rest of the horizontal blanking period is 16% of the horizontal scanning period). However, according to the present invention, since the television signal is enlarged and the blanking period of the television image is also utilized for the information transmission, with respect to the horizontal direction as illustrated in FIG. 8, information 22 during a time period corresponding to the horizontal blanking time period in addition to the conventional information transmission amount (corresponding to the television signal 21 within the effective segment of the television image) can be transmitted. For instance, according to the present invention, if the clock frequency remains at 12.5 MHZ, the pixel number in the horizontal direction can be enlarged up to approximately 800 pixels. Also with respect to the interpolation process in the vertical (Y) direction, the vertical blanking period is similarly utilized so that the total pixel number can be enlarged up to 256 pixels if it would be 240 pixels in the conventional display apparatus. As illustrated in FIG. 9, for instance, an enlargement of the television signal corresponding to such an enlarged pixel number can be realized by periodically interpolating the data both in the horizontal and vertical directions. It should be noted that the television signal is represented as shown in FIG. 9a, and another television signal which has been sampled and thereafter stored in the frame memory 5 is represented as shown in FIG. 9b. Further, in FIG. 9c, there is shown the conditions of the television signal which has been sampled at the short sampling interval in the conventional display apparatus. FIG. 9d represents the conditions of the television signal in the display apparatus according to the present invention, in which the pixel number has been increased. Also, FIG. 9e indicates the conditions of the television signal after the pixel number has been increased also in the vertical direction. In FIG. 9f, there is shown the display condition on the screen in the display apparatus according to the prior art. Moreover, FIG. 9g represents the display condition on the screen in the display apparatus according to the present invention. It should be noted that a pre-interpolation method how preceding data is used as interpolated data has been employed as the interpolation in the preferred embodiment because this method is the most simple method. The enlarging control unit 1 can interpolate the television signal which has been stored in the frame memory 5 up to the pixel number equal to a value which is obtained by dividing the blanking period by the data transmission speed of the first bus 10. Then, the interpolated television signal is sent out to the first bus 10.

As a result, the image information transmission time period corresponding to the blanking period can be added, whereby the absolute amount of the image information in the first bus 10 can be increased without increasing the peak transmission amount of the image information in the first bus 10. Thus, the produced image information is transferred via the buffer memory 6 and the second bus 11 to the predetermined data memory unit 18 corresponding to the respective pixels of each of the modules. The pixels are driven by way of the signal process similar to the predetermined image. As a result, the image can be displayed on such a screen having a relatively large number of pixels, as represented in the "B" part of FIG. 7.

Figure 10:
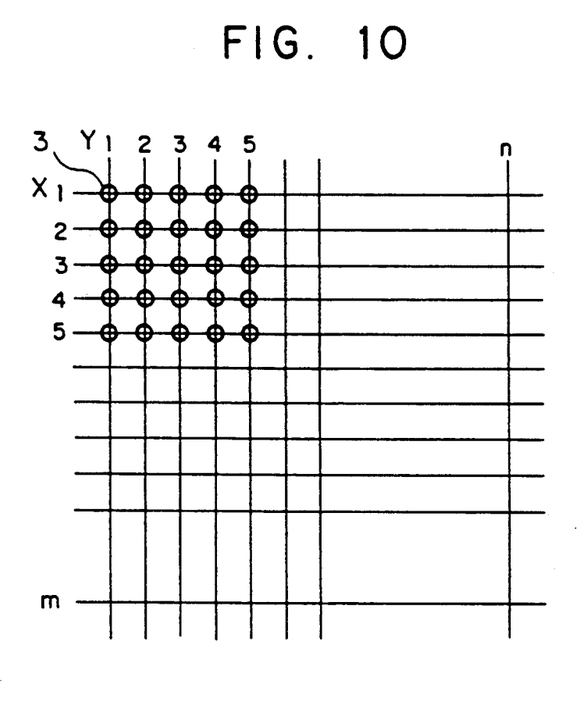
FIG. 10 is an explanatory diagram for representing the drive principle of the matrix type display element; and, FIG. 11 is a timing chart for representing the control timing of the matrix type display element.
Figure 11:
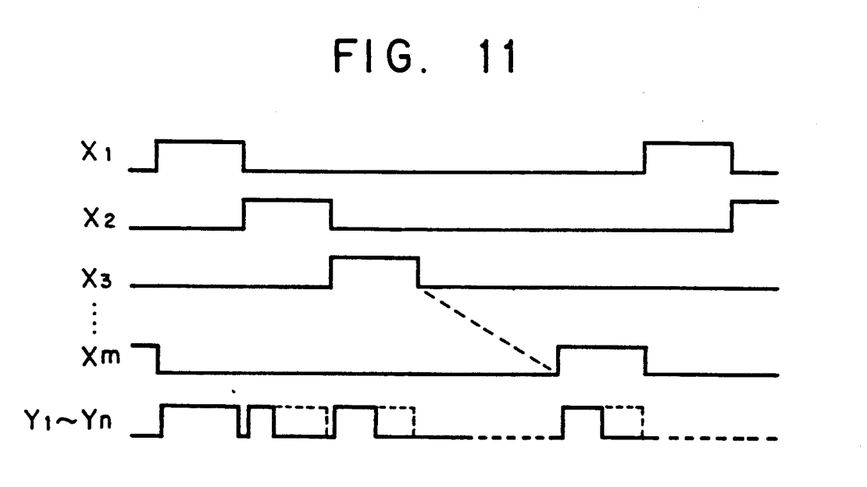

In the above-described preferred embodiment, as the data memory unit 18 corresponding to the display unit 19, the flip-flops 13 are employed to the respective pixels as shown in FIG. 1. Alternatively, either a frame memory having addresses corresponding to the pixels, or similar memory means may be employed Furthermore, in the above-described preferred embodiment, each of the pixels is equal to an independent pixel and is driven separately for the display purpose Instead of this drive method, even when a dynamic drive method may be utilized as shown in various panel displays by which driving means are employed every line (X) and column (Y) so as to control the pixels positioned at the respective cross points between the lines and columns, the similar control may be realized. FIG. 10 represents a relationship between the pixels and the electrodes for the driving purposes, and FIG. 11 illustrates a timing chart of signals to be supplied to the respective electrodes. In FIG. 11, the display element which has been selected in X and Y performs the display operation on the screen Also, in FIG. 11, the variations in the pulse widths of Y represent an example of the density variations. It should be noted that although the driving operations of the respective pixels are controlled every line in the time sequential division.

While has been described in detail, in the display apparatus according to the present invention, the television image is converted into the corresponding digital signal and thereafter the digital signal is once stored in the frame memory, and the television signal information is enlarged during the read operation. Then, the time period corresponding to both the horizontal and vertical blanking periods is added to the time period during which the television signal is effective. As a consequence, the entire information amount can be increased with respect to the screen having a large scaled pixel number without increasing the peak information transmission amount. Accordingly, the image information can be transmitted at the higher efficiency and the television image can be effectively displayed.

What is claimed is:

1. A display apparatus comprising:
    an A/D converter and a sampling unit for digitalizing data included in an effective segment of a television image so as to extract a required number of data for display purposes, whereby digitalized data are outputted as a television signal;
    a display unit in which display elements corresponding to pixels are arranged in a matrix form, for displaying a display television signal;
    a frame memory connected via a transmission path to said display unit, for storing said television signal; and,
    an enlarging control unit for adding a predetermined number of pixel data which can be transmitted via said transmission path within a time period corresponding to both a horizontal blanking period and a vertical blanking period contained in said television image to said television signal so as to make said display television signal.

2. A display apparatus as claimed in claim 1, wherein said display unit includes a data memory unit constructed of flip-flops employed every pixels.

3. A display apparatus as claimed in claim 1, wherein said display unit includes display elements of such a system that a cross point of the matrix is driven.

* * * * *